No. 736,770. PATENTED AUG. 18, 1903.
O. L. PARMENTER.
CIGAR CASE.
APPLICATION FILED MAY 23, 1902. RENEWED APR. 8, 1903.
NO MODEL. 4 SHEETS—SHEET 1.
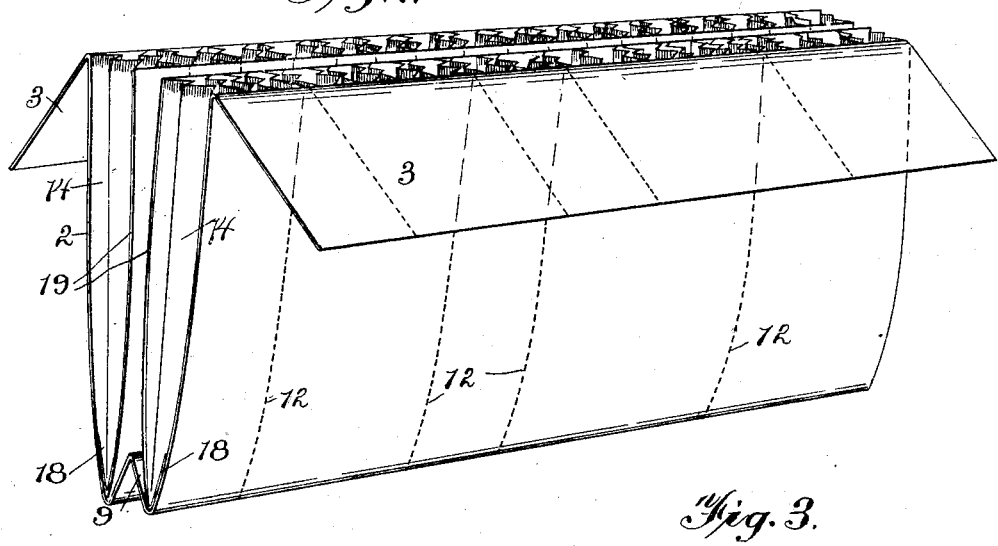
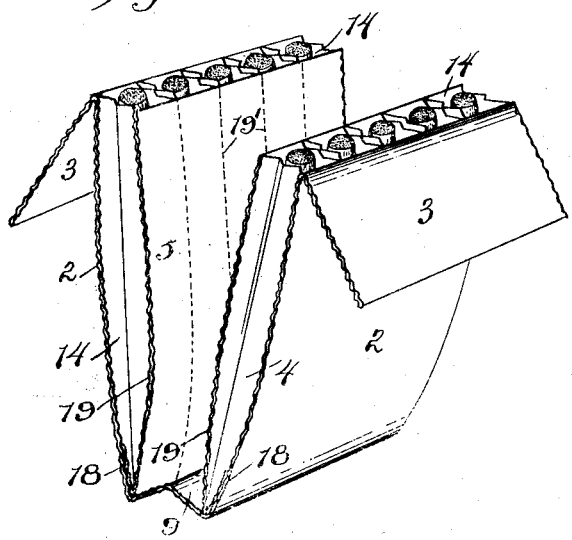
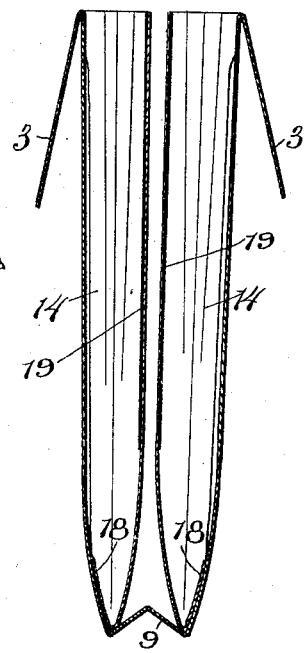
Witnesses
Geo. E. Duch.
E. R. Peck.
Inventor
Orville L. Parmenter
By Hubert E. Bak
Attorney No. 736,770.  
PATENTED AUG. 18, 1903.  
O. L. PARMENTER.  
CIGAR CASE.  
APPLICATION FILED MAY 23, 1902. RENEWED APR. 8, 1903.  
NO MODEL.  
4 SHEETS—SHEET 2.
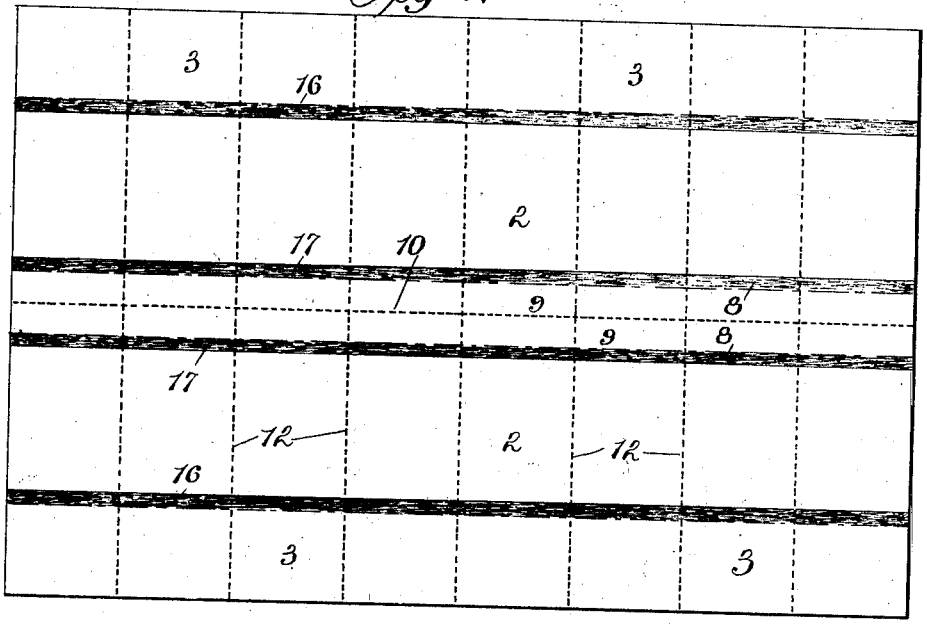
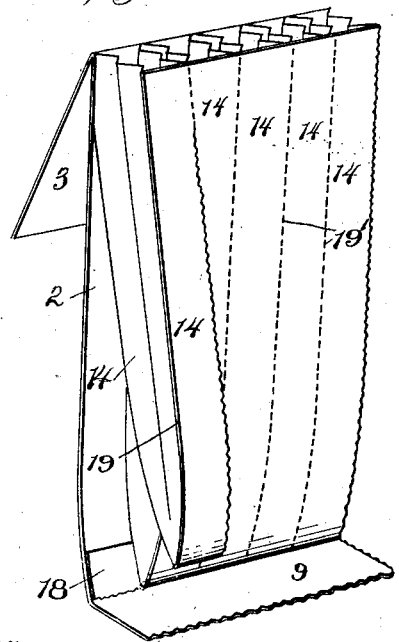
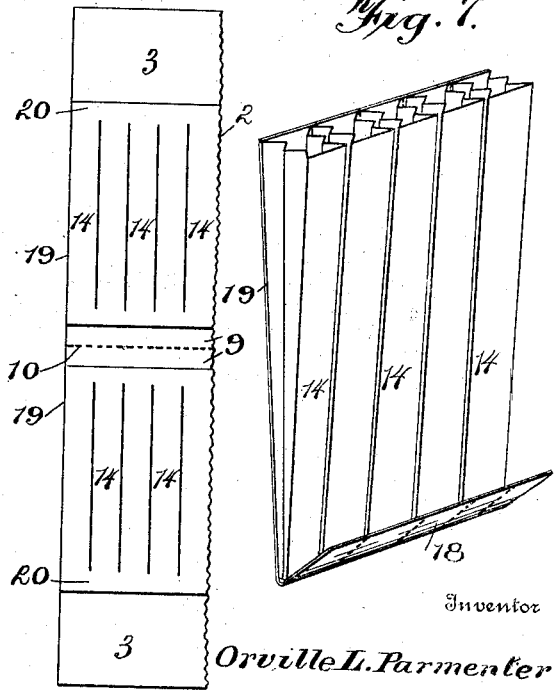
Witnesses  
Geo. E. Drech  
E. R. Peck
Inventor  
Orville L. Parmenter  
By Hubert E. Peck  
Attorney No. 736,770. PATENTED AUG. 18, 1903.
O. L. PARMENTER.
CIGAR CASE.
APPLICATION FILED MAY 23, 1902. RENEWED APR. 8, 1903.
NO MODEL. 4 SHEETS—SHEET 3.
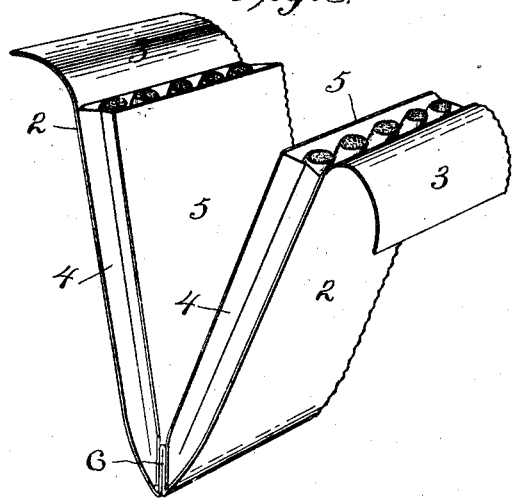
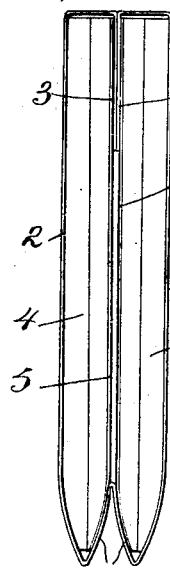
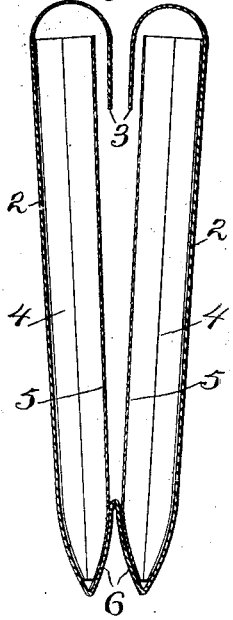
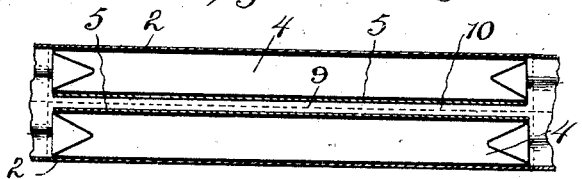
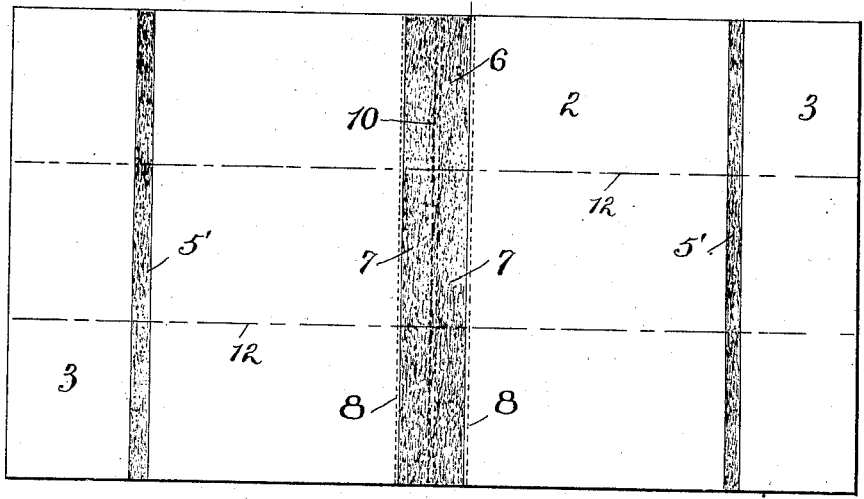
Witnesses
Geo. E. Fuch
E. R. Peck
Inventor
Orville L. Parmenter.
By Hubert E. Peck
Attorney

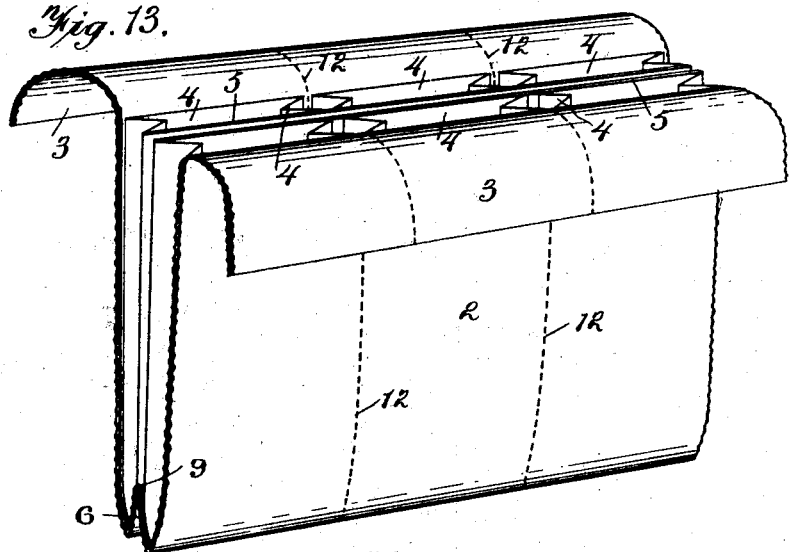
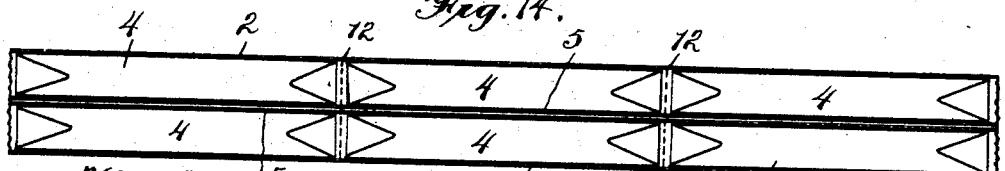
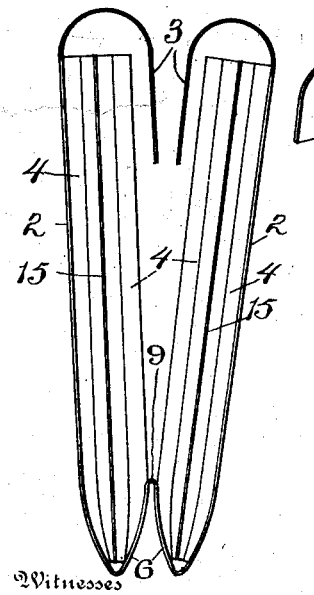
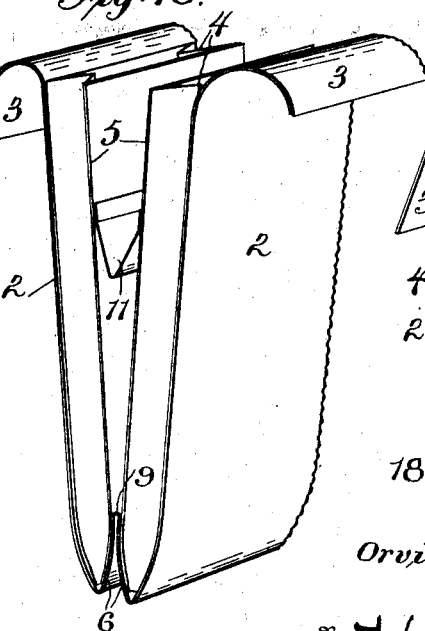
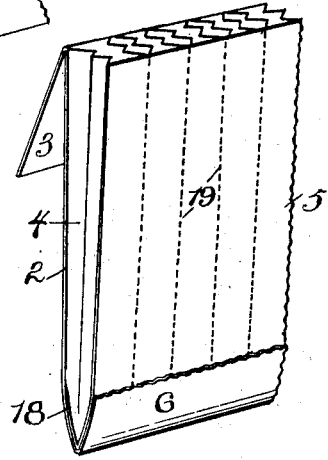

No. 736,770. Patented August 18, 1903.

UNITED STATES PATENT OFFICE.

ORVILLE L. PARMENTER, OF RACINE, WISCONSIN, ASSIGNOR TO RACINE PAPER GOODS COMPANY, OF RACINE, WISCONSIN, A CORPORATION OF WISCONSIN.

CIGAR-CASE.

SPECIFICATION forming part of Letters Patent No. 736,770, dated August 18, 1903.

Application filed May 23, 1902. Renewed April 8, 1903. Serial No. 151,681. (No model.)

*To all whom it may concern:*

Be it known that I, ORVILLE L. PARMENTER, a citizen of the United States, residing at Racine, Racine county, State of Wisconsin, have invented certain new and useful Improvements in Cigar-Cases; and I do hereby declare the following to be a full, clear, and exact description of the invention, such as will enable others skilled in the art to which it appertains to make and use the same.

This invention relates to certain improvements in cases or receptacles for holding several cigars, cigarros, or other articles; and the objects and nature of my invention will be readily understood by those skilled in the art in the light of the following explanations of the constructions shown in the accompanying drawings merely as examples from among other arrangements within the spirit and scope of my invention.

An object of this invention is to provide an exceedingly simple, convenient, and economical case or receptacle for cigars, cigarros, or other articles which can be easily filled with the cigars and from which the cigars can be easily removed separately and individually, as desired, and which will protect and serve as a packing and also a pocket-case for the cigars.

Another object of the invention is to provide an improved cigar pocket-case formed to receive several cigars and composed of paper or equivalent flexible material and consisting of sections which can be readily torn apart or separated intact with their contained cigars.

My invention consists in certain novel features in construction, in combinations, or in arrangements of parts and details, as more fully and particularly pointed out hereinafter.

Referring to the accompanying drawings, Figure 1 is a perspective view of a sheet of detachably-connected cigar-cases, the cases constructed in accordance with my invention, the sheet of cases being so formed that cases of various capacities can be detached therefrom. Fig. 2 is a perspective view showing one of the cases detached filled with cigars and swung open. Fig. 3 is a vertical section through a cigar-case, showing the same opened. Fig. 4 is a plan view, on a reduced scale, of the main backing or stiff-paper covering or connecting sheet for eight cases of equal width, heavy dotted lines indicating the separating, perforated, cut, or scored lines of weakness, light dotted lines indicating the fold-lines, the paste-lines also being indicated. Fig. 5 is a detail perspective view of a detached half or section of a case containing cigars and showing one of its pockets partially separated from the main or covering sheet. Fig. 6 is a plan view of one of the cases flattened out and shown in reduced size. Fig. 7 is a detail perspective view of a sheet of several detachable paper pockets or pouches which can be used in the cases, one ply of backing-sheet not pasted down. Fig. 8 is a perspective of another form of case, detached and filled with cigars. Fig. 9 is an edge view thereof in closed position. Fig. 10 is a vertical section thereof, the case being partially opened. Fig. 11 is a cross-section thereof enlarged. Fig. 12 is a plan view of the main, covering, or connecting stiff or backing sheet for three of the cases shown in Figs. 8, 9, 10, and 11. Fig. 13 is a perspective view of three connected cases of the form shown in Fig. 8, the cases being partially opened and the flaps turned back. Fig. 14 is a cross-section, enlarged, through the cases of Fig. 13. Fig. 15 is an edge view of another form. Fig. 16 is a detail perspective of the case of Fig. 8 with an additional connecting-hinge. Fig. 17 is a detail perspective of the case of Fig. 2, showing the bottom connecting-hinge cemented to the lower ends of the paper-pockets.

The case in the specific examples shown comprises two usually similar compartments or sections each having one or more pockets and a main connecting or backing sheet which faces and is suitably secured to the outer vertical walls of the compartments, and between the closed lower ends of the two compartments is tucked or folded upwardly, so that the web or portion of the sheet connecting the two compartments is usually located at any suitable point above the lower extremities of the compartments. The upper ends of the pockets of the compartments are open for the insertion and removal of cigars, and usually the main sheet has its ends projected upwardly to form two flaps which can be folded over the open ends of the compartments and tucked down between the compartments, although other arrangements can be made to close the compartments or pockets.

Referring to the drawings, 2 is the main backing or connecting flexible sheet which faces the outer walls of the case and extends up the outer walls of the two compartments or sections of the case. The ends of the sheet can be extended beyond the upper or open ends of the pockets of the compartments to form the two closing flaps or extensions 3 3, which are usually sufficiently long to fold inwardly over the open ends of the compartments and then downwardly side by side between the inner walls of the upper ends of the compartments, as shown in Fig. 9. This main sheet is preferably a single or continuous sheet passing up the outer walls of the case and between the lower or closed ends of the compartments thereof. Each compartment can be provided with one or more longitudinal pockets. Where each compartment is provided with a single pocket 4, said pocket is usually formed by a flexible-paper tube having the longitudinal edge folds or tucks whereby the pocket can be collapsed and flattened and whereby it can be expanded to receive the cigars or other articles. This tube is usually open at both ends before being applied, and the ends of the sheet folded to form the tube are brought together, or approximately so, and pasted or otherwise secured to a facing-sheet 5, which is usually located at the inner face or wall of the tube in the completed case. Two of the tubes thus formed are pasted or otherwise secured at their outer walls or faces to the inner surface of the main backing-sheet, usually along the paste-lines indicated by the numerals 5' in Fig. 12. The intermediate portion of said backing-sheet is tucked or folded around the lower ends of the two tubes to close said ends and is extended up at 6 6 along, and if desired can be pasted to, the inner faces of the lower ends of said tubes. In Fig. 12 said last-mentioned paste-lines are indicated by the numerals 7. In said Fig. 12 the fold-lines where said main sheet folds around or over the lower ends of the tubes are indicated by 8 8. If desired, said main sheet can be weakened along said lines 8 8 to fold easily and form a sharp crease, if such be desirable, and also to permit opening the lower end of each compartment by inserting the finger between the outer face of the tube and the main sheet and rending the main sheet along the fold-line 8. However, I do not wish to so limit my invention to this feature or structure, nor do I desire to limit myself to pasting the stiff or cover sheet 2 to the tubes or pocket at 6 6. The main sheet extends across from the inner face of one compartment to the inner face of the other compartment, and thus connects the compartments by the hinge or connecting-web 9 at a point between the ends of the compartments. At this hinge the main sheet or connecting-web (if not a part of the main sheet) forms a fold-line 10 transversely across between the compartments. (See Fig. 12.) This fold-line is preferably formed as a line of weakness or is otherwise formed so that the two sections of a case are separable or detachable from each other along said hinge or fold-line. If desired, the main sheet can be perforated, scored, or otherwise weakened along said line 10, although I do not, as at present advised, wish to so limit my invention. It will hence be observed that in the specific examples illustrated on Sheets 3 and 4 of the drawings the main sheet covers the outer face of each compartment and extends up partially throughout the length of the inner face thereof to close the lower end of the pocket and forms the connecting-ligament between the compartments of the case so located with respect thereto that the lower ends of the compartments can expand in receiving the cigars, as shown by Fig. 10, while the portions of the compartments above said ends lie close together to form a convenient and compact case. This arrangement also permits the compartments to swing open or apart, as shown in Fig. 8, on the hinge or connecting-ligament, while the portions of the compartments below said hinge engage and form stops limiting said opening swing of the compartments. As each compartment is complete within itself, it is often of advantage and utility that one compartment without injury to either compartment of the case can be detached intact with its contained cigars. As the compartments sever along said hinge or connecting-line 10 the main sheet remains intact throughout each compartment and closing the lower end thereof. In some instances the main sheet may not be depended on to form the connecting-hinge; but one or more folded strips of flexible paper or other suitable material can be arranged transversely between the compartments and pasted or otherwise secured to the inner faces thereof, as shown in Fig. 16, and, if desirable, a connecting-hinge or folded flexible strip 11 can also be pasted between the upper portions of the two compartments, as well as between the lower portions thereof, and said hinges or connecting portions or ligaments can be arranged to afford a greater or less degree or amount of separating movement between the compartments.

Usually I do not paste or secure the main sheet throughout the lengths of the outer faces of the tubes or pockets, but can paste along the upper portion of the tube and leave the sheet loose down the remainder of the length of the tube, although I do not wish to limit my invention to this particular.

These cases can be conveniently and most economically manufactured and placed on the market in sheets or series of detachably-connected cases. A single main sheet is provided long enough for a suitable number of cases and is perforated, slit, or otherwise weakened on the parallel lines 12, the distance between said lines being equal to the width of a case. Said sheet is also provided with the fold or weakened lines therein, before referred to, and by the necessary means has the lines of paste applied thereto. The tubes to form the pockets are also made in sheet-like form— that is, in chains closely pasted in parallelism on an elongated facing-sheet 5—perforated on lines between the tubes, said lines of perforations in sheet 5 coinciding with the lines 12 of perforations in the main sheet. Two sheets or chains of the tubes carried by sheet 5 are then pasted, as before described, on the inner face of the main sheet, and the main sheet is folded, as before described, so that the two sheets 5 5 form the inner walls of the compartments, and in the sheet or series of cases said two sheets 5 5 lie together. When in the sheet-like form, the cases are connected together by the backing-sheet and the two facing-sheets 5, and they can be closely compressed, and thus packed flatly in a small compass. The cases can be easily detached from each other by separating along the lines of perforations, leaving each case perfect and intact.

If desired, each or either compartment of a case can be provided with two of the pockets, each pocket the same in width as the case. For instance, in Fig. 15 I show such an arrangement formed by pasting the collapsible paper tubes in juxtaposition on both sides of the facing-strip 15, (the same as sheet 5,) so that each strip or sheet 15 carries two sets of tubes arranged on opposite faces thereof, the sheet being perforated or separable on lines between each pair of tubes. This double sheet of tubes is pasted in the main sheet 2, as before described, which compresses and closes the lower ends of each pair of tubes as where only the single tubes are employed.

As at present advised, I prefer to form the compartments of each case of a series of long narrow detachably-connected pockets or pouches each of a size to receive a single cigar or like article. On Sheets 1 and 2 of the drawings I have illustrated such a construction. The stiff cover or connecting sheet for a series of cases can be formed with separating and fold lines, as hereinbefore described. The cigar-pockets 14 are made in sheet-like form of a series of detachably-connected pockets, each pocket of which is usually formed of a separated paper tube having side folds to permit compression and expansion of the tube. These tubes are pasted in parallelism to a backing-sheet 19, separable on lines between the tubes. The backing-sheet is folded to form two plies, and the tubes can be pasted between the two plies, which can cover both faces of the tubes, or one ply can completely cover one face of each tube and only partially cover the opposite face of the tube. The backing-sheet 19 folds over and closes the lower ends of the tubes and leaves the upper ends thereof open for the insertion and removal of cigars. Two series of detachably-connected pockets thus formed are pasted to the inner faces of the two plies of the stiff covering or connecting sheet 2 of the case (see Figs. 2 and 6) usually so that the backing-sheets 19 of the sheets of pockets are located at the inner faces thereof. The sheets of pockets are usually pasted at their upper and lower ends only along the paste-lines 16 17, Fig. 4, so that any pocket can be torn from the sheet of pockets and from the case. If desired, the extended end 18 of the backing-sheets 19 of a sheet of pockets need not be pasted down on the inner faces of the pockets, (see Fig. 7,) but can be folded over the lower ends of the pockets and then have its outer face pasted to the cover-sheet along the line 17 to permit ready detachment of any pocket from the cover or stiff sheet 2, still leaving the detached tube or pocket with its contained cigar practically intact. Also, if desired, the backing-sheet 19 of a sheet of pockets can be perforated or weakened on the separating-lines 19', or said separating-lines can be formed by a single cut or slit, leaving connecting-ligaments 20 20 between the pockets at the ends thereof only. (See Fig. 6.) By forming such long slits in the backing-sheets 19 an individual pocket containing a cigar can be easily grasped by the fingers and torn or separated from the cigar-case, as one finger can project through the slit in the backing-sheet to engage the inner side edge of the pocket while the thumb engages the exposed side edge of the pocket. The pocket thus detached is only obliged to be freed at its ends from the stiff cover-sheet and from the next adjacent pocket, and this separation takes place without material injury to the adjacent pockets or to the cover-sheet.

In manufacturing the cases the stiff cover or connecting sheet 2 is prepared with the transverse weakened separating-lines 12, so that each case will contain the desired number of detachable pockets. Sheets of the detachable pockets in compressed or collapsed condition are then pasted on the two plies of the cover-sheet with their lower or inner closed ends along lines 17 and their outer or upper open ends along lines 16. The long cover-sheet with the sheets of pockets on the inner face thereof is then folded along the lines 8 8 10, as hereinbefore described, to form the upwardly tucked or folded hinge or connecting-ligament between the opposite plies of the cover-sheet, which are brought together with the sheets of pockets at their inner faces. The hinge or connecting portion of the sheet need not be pasted down on the pockets, but is preferably perforated or weakened along the line 10, so that the two sections of a case can be torn apart to form two separate and intact cases, Fig. 5, which can be conveniently carried in the pocket and from which the individual cigar-pockets can be torn, as desired.

The cover-sheet can be weakened along the lines 12 to form cases each containing any desired number of individual cigar-pockets. For instance, in Fig. 1 the lines 12 are so spaced that the first case torn off will contain two pockets on each side; the second, four pockets on each side; the third, two on each side; the fourth, five on each side, and so on. The separating-lines 12 can be arranged in any suitable manner, so as to coincide with the separating-lines in the backing-sheets 19, and, if desired, a cigar-case can have one or more lines of perforations or separations 12, coinciding with the separating-lines in the backing-sheets of the individual pockets, so that the cigar-case when filled with cigars can be divided up or separated into smaller complete cases of the same construction as the original case, but merely narrower and containing a smaller number of cigars.

As at present advised I do not wish to limit the broad features of my invention to so pasting the sheets of detachable individual cigar-pockets on the cover-sheet that said pockets will be intended for ready individual detachment without material mutilation.

It is evident that various modifications, arrangements, and variations can be resorted to without departing from the spirit and scope of my invention. Hence I do not wish to limit myself to the exact constructions shown and disclosures made, but consider myself entitled to all such changes as fall within the spirit and scope of my invention.

Having thus fully described my invention, what I claim as new, and desire to secure by Letters Patent of the United States, is—

1. A cigar-case comprising the two cigar-receiving compartments each individually complete and having one or more collapsible pockets closed at the lower end and open at the upper end and a single cover-sheet for both compartments having its upper ends extended to form the flaps adapted to fold over the open ends of the compartment and down between the same, said sheet folded to form a hinge connection between the lower ends of the compartments, said connection formed to permit the compartments to swing and separate at their upper ends, substantially as described.

2. A cigar-case comprising two cigar-receiving compartments, each compressed and closed at the lower end and open at the upper end and having one or more collapsible pockets, and a single cover-sheet for both compartments intermediate its length folded to form a loose expansible hinge connection between the lower ends of the compartments, thereby permitting the compartments when filled with cigars to be folded together with their inner faces in contact and their lower closed ends separated from each other.

3. A cigar-case comprising two individually-complete compartments having longitudinally-folded collapsible side walls and closed lower ends and open upper ends, and a cover-sheet forming the outer walls of both compartments and a loose hinge connection between the lower ends of the two compartments, said connection formed with a transverse weakened severing-line.

4. A collapsible folding cigar-case having a top-closing flap, and comprising a cover-sheet transversely folded and creased to form two plies, and two separately-formed cigar-receiving compartments secured to the inner faces of said plies, said compartments having folded collapsible side walls, closed lower ends and open upper ends, an intermediate creased foldable length of said cover-sheet forming a loose hinge connection between said compartments, whereby the compartments can be detached intact.

5. A cigar-case comprising a single cover-sheet folded to form two plies and an upwardly-folded creased connecting hinge portion between the plies, and separately-formed compartments pasted to the plies of the cover-sheet, said compartments closed at their lower ends and open at their upper ends, said hinge forming the sole connection between the compartments of the case and located between the compartments while the same are expanded and folded together.

6. A cigar-case comprising two loosely-connected individually-complete compartments, each compartment having one or more collapsible pockets independent of and separately formed from the pocket or pockets of the other compartment, and a single cover-sheet for the two compartments folded or creased between the closed lower ends of the compartments and forming the sole connection between the two compartments.

7. A cigar-case comprising a cover-sheet folded to form two plies with a loose upwardly-doubled creased connecting portion between the lower ends of the two plies, and the two sheets of detachably-connected individual cigar-pockets secured, respectively, to the inner faces of said plies of the cover-sheet, said upwardly-doubled connecting portion of the cover-sheet folding upwardly between the inner faces of the lower portions of the two sheets of pockets, substantially as described.

8. A cigar-case comprising a cover-sheet, and a series of detachably-connected parallel collapsible cigar-pockets in sheet-like form, open at their upper ends and closed at their lower ends, said sheet of detachably-connected pockets removably secured to said cover-sheet, whereby said pockets can be individually detached from the cover-sheet and from the remaining pockets, substantially as described.

9. A sheet or series of detachable cigar-cases comprising a main connecting-sheet folded to form the outer walls of each case, each case comprising two collapsible compartments, and two series or sheets of pockets forming said compartments, each series of pockets secured on a facing-strip, said sheet and strips severable or detachable on lines between the pockets, the lower ends of the compartments being closed and provided with hinge connections, substantially as described.

10. A cigar-case comprising two collapsible compartments with open upper ends and compressed closed lower ends, and an upwardly folded and creased hinge connection between the inner walls of the compartments formed with a transverse weakened fold-line, substantially as described.

11. A cigar-case comprising a cover-sheet and a series of individual detachably-connected cigar-pockets, in sheet-like form, pasted to the inner face of said cover-sheet, and comprising a backing-sheet and the series of tubes pasted thereon, substantially as described.

12. A cigar-case comprising a cover-sheet folded to form two plies with the inturned fold or hinge between the plies having the weakened separating-line, and the sheets of individual detachable cigar-pockets secured to the inner faces of both plies, substantially as described.

13. A cover-sheet folded to form two plies and two or more individual paper cigar-pockets detachably secured to the cover-sheet, said individual pockets comprising parallel paper tubes and a backing-sheet detachably uniting and pasted to said tubes, substantially as described.

14. A cover-sheet having transverse parallel lines of separation, said sheet folded to form two plies, and the series of individual detachably-connected cigar-pockets, arranged in connected sheet-like form, each ply of the cover-sheet having a sheet of said pockets, secured to its inner face, so that the sheets of detachable pockets are arranged between the plies of the cover-sheet, the lines of separation between said pockets coinciding with said lines of separation of the cover-sheet, substantially as described.

15. In a device of the character specified, the single cover-sheet folded to form the two plies with the intermediate transverse upwardly doubled or folded portion, said cover-sheet formed with the parallel lines of separation and with the crease forming a line of weakness throughout the length of said intermediate doubled portion, and the two sheets of collapsible paper cigar-pockets pasted to the inner faces of said two plies of the cover-sheet with said intermediate folded portion of the cover-sheet arranged between the inner faces of the lower portions of the two sheets of pockets, each sheet of pockets comprising series of paper tubes and a backing-sheet pasted thereto and separable on lines between the pockets, certain lines of separation of the sheets of pockets coinciding with the lines of separation of the cover-sheet, substantially as described.

16. A cigar-case comprising a cover-sheet folded to form two plies with a connecting hinge portion, and two sheets of detachable collapsible paper cigar-pockets, each sheet comprising a series of paper tubes cemented to and detachably connected by a backing-sheet, each sheet of pockets being cemented to the cover-sheet on lines along the upper and lower ends of the pockets for the purposes substantially as described.

17. A cigar-case comprising a cover-sheet folded to form an intermediate connecting hinge portion and two plies, and series of paper cigar-pockets in sheet-like form secured to the inner faces of said plies of the cover-sheet and consisting of a backing-sheet having paper tubes pasted thereto, said backing-sheet being severable on lines between the tubes, substantially as described.

18. Cigar-cases in sheet-like form comprising a cover-sheet folded to form plies and having lines of weakness, and series of paper cigar-pockets in sheet-like form secured to the cover-sheet and comprising a backing-sheet and paper tubes secured thereon, the backing-sheet having lines of separation between the tubes, certain of said lines of separation of the backing-sheet coinciding with said lines of weakness of the cover-sheet, substantially as described.

19. A cigar-case comprising a sheet having a transverse fold and severing-line and two individually-complete and approximately similar collapsible compartments loosely hinged together by said sheet which forms an essential outer wall of each compartment when detached, each compartment having a compressed closed end and an opposite open end and a flap to fold over the open end and extend down between the compartments when folded together on said sheet, substantially as described.

20. A cigar-case comprising two individually-complete loosely-connected compartments formed with collapsible side walls and having independent flaps to fold over the open ends of the compartments and extend down between the same when said compartments are folded together, and a sheet forming a severable hinge connection between the inner sides of the compartments, whereby the compartments can be folded together and swung apart on said hinge and can be detached intact from each other, said hinge connection arranged between the inner faces of the two compartments, substantially as described.

21. A cigar-case comprising two individually-complete collapsible compartments having closed lower ends and open upper ends and extended outer walls forming independent flaps to fold over the open ends of the compartments and extend down between the two compartments when folded together, and a paper sheet forming an essential part of and connecting both compartments and having a connecting hinge portion with a transverse fold-line between the inner faces of the two compartments, substantially as described.

22. A cigar-case composed of two individually-complete compartments, a single sheet forming a wall of both compartments, each compartment comprising a pocket open at its upper end and closed at its lower end and having collapsible sides secured to said sheet, said sheet constituting a loose hinge connection between adjoining edges of said compartments and formed to permit separation of the lower ends thereof when the pockets expand.

23. A cigar-case comprising two collapsible compartments, closed and compressed at their lower ends and open at the upper ends and having longitudinally folded or collapsible side walls, said compartments when expanded adapted to rest with their inner faces together and their lower ends separated, and a single sheet forming a wall of both compartments and a hinge connection between adjoining portions of the two compartments and located between the inner faces of the compartments when folded together.

In testimony whereof I affix my signature in presence of two witnesses.

ORVILLE L. PARMENTER.

Witnesses:
ELBERT B. HAND,
MAUDE WILD.